United States Patent

Draghetti et al.

[11] Patent Number: 5,746,229
[45] Date of Patent: May 5, 1998

[54] PERFORATING UNIT FOR PRODUCING VENTILATED CIGARETTES

[75] Inventors: Fiorenzo Draghetti, Medicina; Roberto Polloni, Modigliana, both of Italy

[73] Assignee: G.D Societa' Per Azioni, Bologna, Italy

[21] Appl. No.: 696,397

[22] Filed: Aug. 14, 1996

[30] Foreign Application Priority Data

Aug. 24, 1995 [IT] Italy ................... BO95A0402

[51] Int. Cl.$^6$ .................................... A24C 1/38
[52] U.S. Cl. .................... 131/281; 219/121.6; 359/558
[58] Field of Search .................... 131/281; 219/121.6, 219/121.7, 121.71, 121.77; 359/558, 618, 619, 625

[56] References Cited

U.S. PATENT DOCUMENTS

| | | | |
|---|---|---|---|
| 4,647,752 | 3/1987 | Mattei et al. | 219/121.71 |
| 5,060,668 | 10/1991 | Weinhold | 131/281 |
| 5,103,841 | 4/1992 | Okumoto et al. | 131/281 |
| 5,105,833 | 4/1992 | Mattei | 131/281 |
| 5,498,851 | 3/1996 | Hayashi et al. | 219/121.77 X |

FOREIGN PATENT DOCUMENTS

| | | | |
|---|---|---|---|
| 2410446 | 12/1978 | France . | |
| 3418188 | 11/1985 | Germany . | |
| 2167936 | 6/1986 | United Kingdom . | |
| 2219485 | 12/1989 | United Kingdom | 131/281 |

*Primary Examiner*—Vincent Millin
*Attorney, Agent, or Firm*—Ladas & Parry

[57] ABSTRACT

A perforating unit for producing ventilated cigarettes, wherein a laser beam, emitted by a laser source along an axis, is reflected and focused by a movable reflecting and focusing assembly and a reflecting element, both rotating about the axis, to produce a focused beam directed on to given points of a succession of cigarettes traveling about both the axis of the beam and about their own axis; the movable assembly presenting at least one diffracting optical element for dividing the focused beam into a given number of identical further beams to form, on each cigarette, a number of rings of ventilation holes equal to the aforementioned given number.

7 Claims, 2 Drawing Sheets

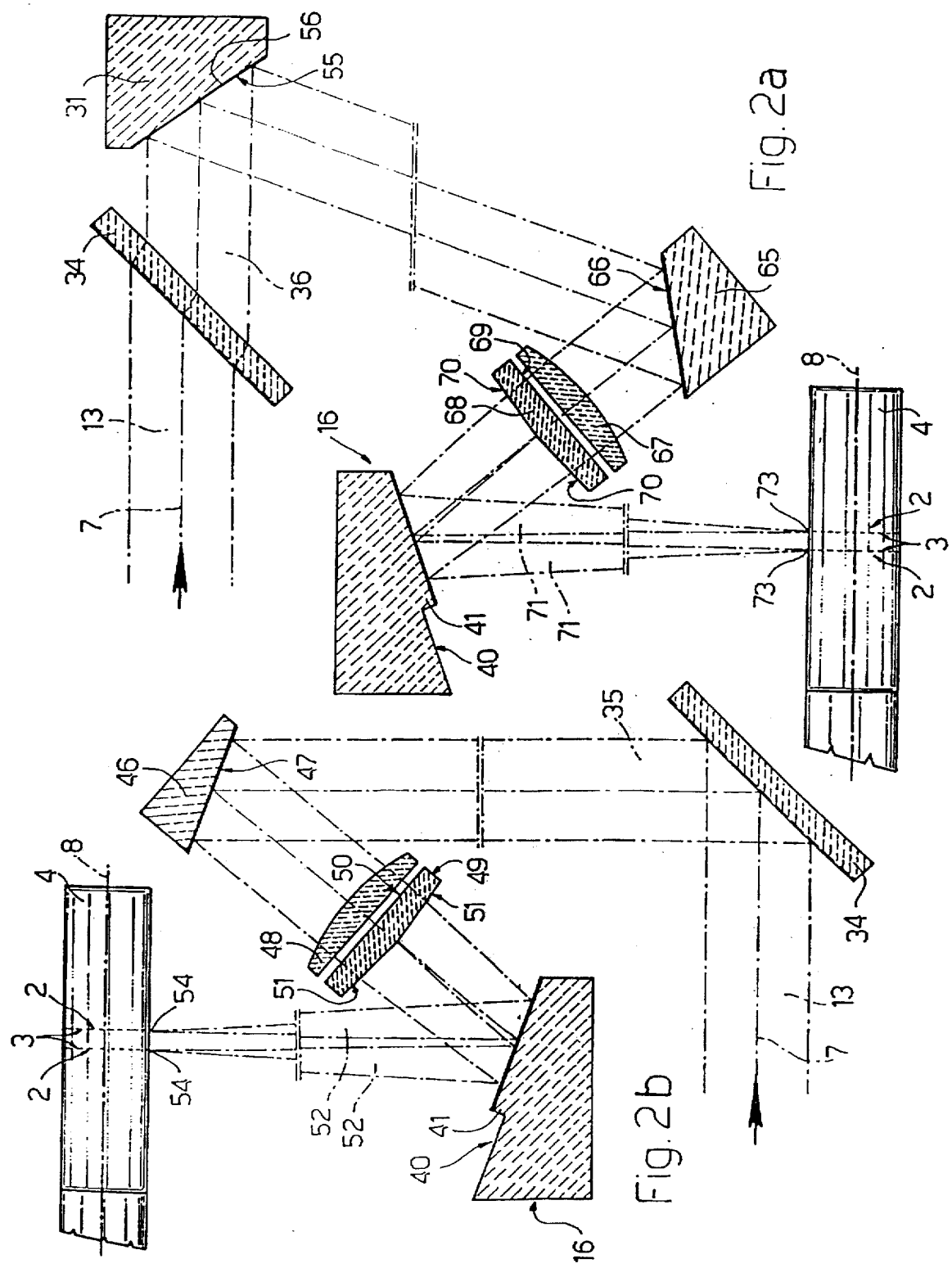

1

PERFORATING UNIT FOR PRODUCING VENTILATED CIGARETTES

BACKGROUND OF THE INVENTION

The present invention relates to a perforating unit for producing ventilated cigarettes.

So-called "ventilated" cigarettes are produced, as described for example in U.S. Pat. No. 5,105,833, using perforating devices, the perforating "tool" of which comprises a laser beam focused on to the cigarettes to form, on each cigarette, a single ring of ventilation holes, i.e. a number of holes aligned along the same circumference.

SUMMARY OF THE INVENTION

It is an object of the present invention to provide a straightforward, low-cost perforating unit for producing ventilated cigarettes presenting at least two rings of ventilation holes per cigarette.

According to the present invention, there is provided a perforating unit for producing ventilated cigarettes, the unit comprising conveying means for successively feeding cigarettes along a path extending about a first axis and crosswise to a second axis of the cigarettes; rotation means associated with the conveying means, and for rotating each cigarette about the respective second axis as the cigarette travels along said path; a laser source for emitting a laser beam along the first axis; a movable reflecting and focusing assembly; and a reflecting element rotating about the first axis to receive said beam and direct a focused beam on to given points of the cigarettes; characterized in that the movable assembly comprises at least one diffracting optical element for dividing the focused beam into a given number of identical further laser beams to form on each cigarette a number of rings of ventilation holes equal to said given number.

BRIEF DESCRIPTION OF THE DRAWINGS

A non-limiting embodiment of the present invention will be described by way of example with reference to the accompanying drawings, in which:

FIG. 2 shows, with parts removed for clarity, a schematic detail of FIG. 1.

DETAILED DESCRIPTION OF THE INVENTION

Figure 1:
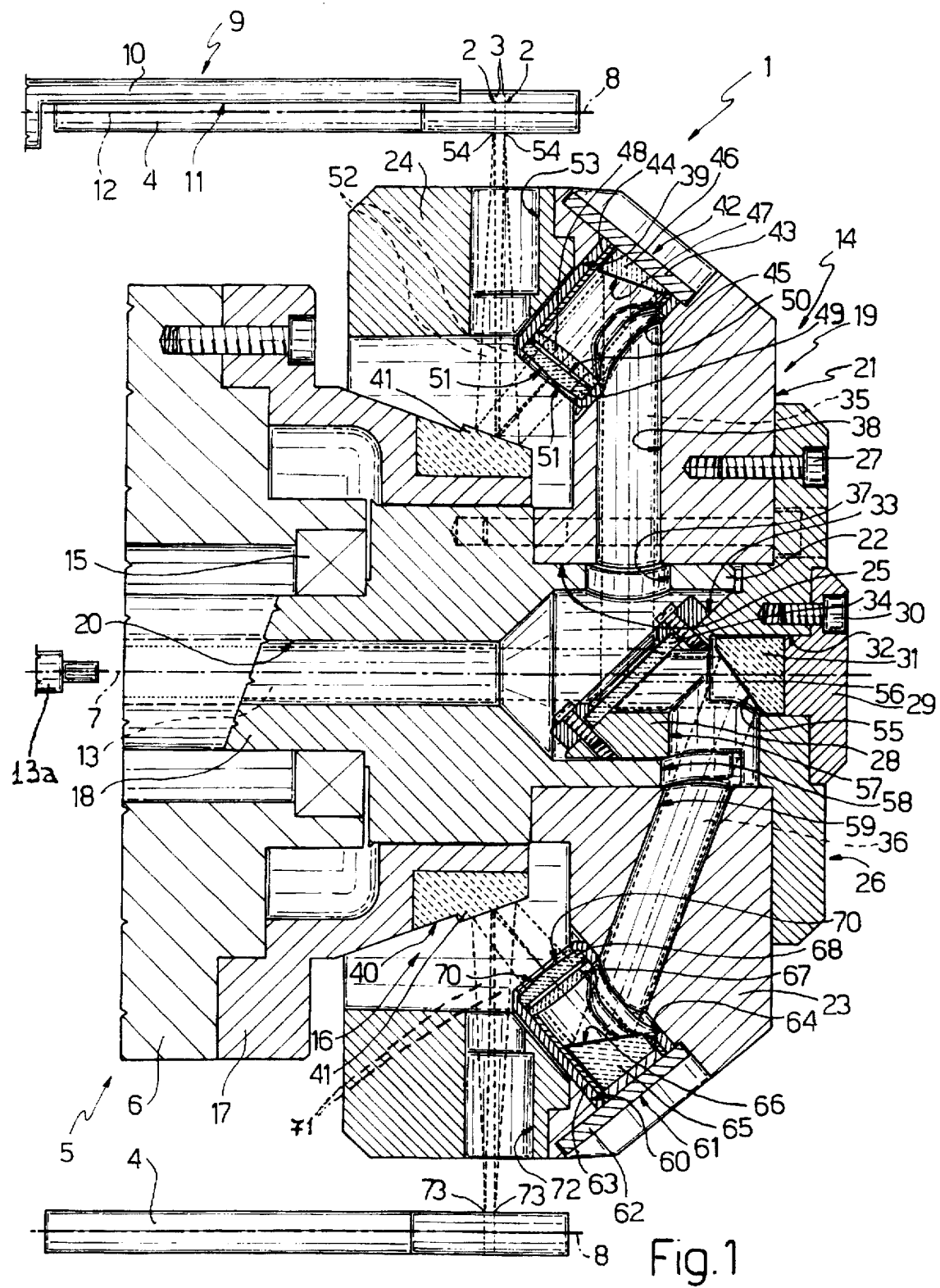
FIG. 1 shows a cross section of a preferred embodiment of the unit according to the present invention.

Numeral 1 in the accompanying drawings indicates a laser perforating unit for forming at least two parallel rings 2 of ventilation holes 3 at one end of a number of cigarettes 4, and so producing ventilated cigarettes 4.

Unit 1 comprises a conveying device 5, in turn comprising a conveying drum 6, which is powered to rotate about an axis 7 at a first substantially constant angular speed, and to successively feed cigarettes 4 along a path P extending about axis 7 and in a direction crosswise to the longitudinal axis 8, parallel to axis 7, of cigarettes 4.

Unit 1 also comprises a rotation device 9 fitted to and activated in known manner by drum 6, and which, for each cigarette 4, comprises a gondola 10 presenting a seat 11 for retaining in known manner a respective cigarette 4 projecting from seat 11 itself, and for rotating respective cigarette 4 about its own axis 12 parallel to axis 7 and substantially coincident with axis 8.

Unit 1 also comprises a laser source 13a for emitting a beam 13 along an axis coincident with axis 7 of drum 6; a movable reflecting and focusing assembly 14 fitted in rotary manner to drum 6, via the interposition of bearings 15, so as to rotate about axis 7; and a reflecting element 16 in the form of a truncated regular pyramid coaxial with axis 7 and with its vertex facing away from drum 6, and which is connected integral with drum 6 via the interposition of a bell 17 extending from drum 6 towards movable assembly 14 and with its concavity facing drum 6. Movable assembly 14 and reflecting element 16 provide for directing beam 13 on to each cigarette 4 to form rings 2 of holes 3.

Movable assembly 14 comprises a tubular shaft 18 mounted for rotation about axis 7 inside drum 6, and powered to rotate at a second angular speed, which is variable as required and increased, in relation to the first angular speed, in proportion to the number of holes 3 to be formed in each ring 2 in each cigarette 4. Movable assembly 14 also comprises a head 19 fitted in projecting manner to shaft 18, to the front of the front end of bell 17; and laser source 13a is located on the opposite side of drum 6 to head 19, and emits beam 13 along an axial conduit 20 inside shaft 18 and into head 19.

Head 19 comprises a cup-shaped body 21 fitted, with its concavity facing bell 17, to a cylindrical end portion 22 of shaft 18 projecting beyond the front end of bell 17; cup-shaped body 21 comprises an end wall 23 perpendicular to axis 7, and a cylindrical lateral wall 24 coaxial with axis 7 and extending over bell 17 from wall 23; and wall 23 presents a central through hole 25 in which portion 22 of shaft 18 is fitted.

The front end of hole 25 is closed by a cover 26 fitted to a front surface of wall 23 by screws 27 and presenting a tubular appendix 28, which extends inside portion 22 and is closed at the front by a plug 29 fitted to cover 26 by screws 30. Cover 26 also presents an appendix 31 extending inside a hole 32 formed coaxially with axis 7 through appendix 28.

Appendix 28 is defined at the rear by an annular surface 33 housed inside portion 22 and appropriately inclined, e.g. by an angle of substantially 45°, in relation to axis 7, and which is fitted with a semitransparent mirror 34 for dividing beam 13 into two identical beams 35 and 36. Beam 35 is deflected outwards by mirror 34 through a first radial hole 37 formed through portion 22, and a second hole 38 coaxial with hole 37 and formed through wall 23. Hole 38 terminates inside an oblique hole 39 formed through wall 23 and extending towards reflecting element 16, which presents an oblique annular surface 40 in turn presenting, for each gondola 10, a respective reflecting surface or mirror 41 facing the portion of cigarette 4 projecting from respective gondola 10.

Hole 39 is engaged by a hollow plug 42 comprising a front end wall 43, and a cylindrical lateral wall 44 presenting a lateral hole 45 coincident with hole 38. Wall 43 is fitted with an appendix 46 extending inside wall 44 and defined by an inclined reflecting surface 47 for receiving and deflecting beam 35 towards axis 7 through a focusing lens 48 housed inside and crosswise to wall 44, and through a diffracting optical element 49 forming part of movable assembly 14 and fitted to wall 44, e.g. on the opposite side of lens 48 to reflecting surface 47.

Optical element 49 presents a flat front surface 50 facing lens 48 and crosswise to the direction of incidence of beam 35; and at least two flat rear surfaces 51 inclined by a given angle A in relation to surface 50 so that optical element 49 is wedge-shaped with its vertex facing axis 7. Optical element 49 provides for dividing beam 35 into a number of identical beams 52 equal to the number of surfaces 51 with which optical element 49 is provided.

Lens 48 cooperates with optical element 49 to focus beams 52 at respective focal points (not shown) at axis 7, but, in actual use, beams 52 are intercepted by mirrors 41, each of which reflects beams 52 radially outwards through a radial hole 53 formed through wall 24, so as to form respective reflected focal points 54 on the periphery of the end of cigarette 4 projecting from respective gondola 10.

Appendix 31 terminates at the rear with an oblique surface 55 appropriately inclined in relation to surface 33 and supporting a mirror 56, which provides for deflecting beam 36 outwards through a hole 57 formed in appendix 28, a hole 58 formed through portion 22, and a hole 59 formed through wall 23 coaxially with holes 57, 58, and terminating inside an oblique hole 60 formed through wall 24 and extending towards mirrors 41.

Hole 60 is engaged by a hollow plug 61 comprising a front end wall 62, and a cylindrical lateral wall 63 presenting a lateral hole 64 coincident with hole 59. Wall 62 is fitted with an appendix 65 extending inside wall 63 and defined by an inclined reflecting surface 66 for receiving and deflecting beam 36 towards axis 7 through a focusing lens 67 housed inside and crosswise to wall 63, and through a diffracting optical element 68 forming part of movable assembly 14 and fitted to wall 63 on the opposite side of lens 67 to reflecting surface 66.

Optical element 68 presents a flat front surface 69 facing lens 67 and crosswise to the direction of incidence of beam 36; and at least two flat rear surfaces 70 inclined by a given angle A in relation to surface 69 so that optical element 68 is wedge-shaped with its vertex facing axis 7. Optical element 68 provides for dividing beam 36 into a number of identical beams 71 equal to the number of surfaces 70 with which optical element 68 is provided.

Lens 67 cooperates with optical element 68 to focus beams 71 at respective focal points (not shown) at axis 7, but, in actual use, beams 71 are intercepted by mirrors 41, each of which reflects beams 71 radially outwards through a radial hole 72 formed through wall 24, so as to form respective reflected focal points 73 on the periphery of the end of cigarette 4 projecting from respective gondola 10.

In actual use, cigarettes 4 are perforated as they are fed, transversely to their respective axes 8, along a given perforating arc of less than 360° and normally extending between a loading position (not shown) where cigarettes 4 are loaded on to drum 6, and an unloading position (not shown) where ventilated cigarettes 4 are unloaded off drum 6. Cigarettes 4 are fed transversely along the perforating arc, and are rotated at constant speed about respective axes 8 by respective gondolas 10 so as to make a given number of complete turns about respective axes 8 between the start and end of the perforating arc.

During perforation, movable assembly 14 is rotated about axis 7 in the same direction as drum 6, but at an angular speed which, in absolute value, is greater than that of drum 6 in proportion to the number of holes 3 to be formed in each ring 2. As movable assembly 14 is rotated about axis 7, beams 52 and 71 sweep along each mirror 41 and are focused at respective points 54 and 73 for as long as it takes to perforate each cigarette 4. For example, given a perforating arc of 240°, and assuming each cigarette 4, as it travels along the perforating arc, makes two complete turns about its axis 8, and twenty ventilation holes are required in each cigarette 4, then movable assembly 14 will be rotated at an angular speed "roughly" fifteen times that of drum 6.

Assuming the above operating conditions, for each complete turn of movable assembly 14 about axis 7, unit 1 forms two holes 3 for each ring 2 on each cigarette 4 within the perforating arc, and each cigarette 4 leaving the perforating arc presents at least two rings 2 of twenty holes 3 arranged along the same circumference of cigarette 4.

Known laser perforating units for producing ventilated cigarettes 4 with one ring 2 of holes 3 may be converted into laser perforating units for producing ventilated cigarettes 4 with at least two rings 2 of holes 3 by simply providing an optical element of the type described at a given point along the path of the laser beam. Alternatively, further rings 2 of holes 3 or additional holes 3 for each ring 2 may be formed by simply using optical elements substantially similar to those described, but featuring, as opposed to two rear surfaces 51, 70, a given number of flat rear surfaces ranging from a minimum of two to a maximum of six, as required for perforating cigarettes 4.

As regards head 19, the optical assemblies corresponding to reflecting surface 47, lens 48 and optical element 49, or corresponding to reflecting surface 66, lens 67 and optical element 68, may be other than two in number, head 19 in fact being fittable with one or with three or four such optical assemblies. If other than two optical assemblies are used, device 34, 56 for dividing the beam must be replaced by a device appropriately modified to divide the incoming beam into the required number of beams.

We claim:

1. A perforating unit (1) for producing ventilated cigarettes (4), the unit comprising cigarette conveying means (5) including a plurality of equally spaced seats (11) for accommodating respective cigarettes (4), said conveying means (5) successively feeding said seats (11) along a path (P) extending about a first axis (7) and crosswise to a second axis (8) of the seats (11); rotation means (9) associated with the conveying means (5) for rotating each seat (11) about the respective second axis (8) as the seat (11) travels along said path (P); a laser source (13a) for emitting a laser beam (13) along the first axis (7); a movable reflecting and focusing assembly (14) comprising at least a focusing means (48), (67) for focusing said laser beam (13), reflecting means (34, 31, 46) for directing said laser beam (13) to impinge onto said focusing means (48, 67) and to pass therethrough to become a focused beam (35; 36), and at least one diffracting optical element (49; 68) for dividing said focused beam (35; 36) into a given number of identical further focused beams (52; 71); and a faceted reflecting element (16) having the shape of a truncated regular pyramid disposed coaxially with said first axis and directed toward said reflecting and focusing assembly (14); said reflecting element (16) being mounted for rotation with said seats (11) about the first axis (7) to direct said further focused beams (52, 71) onto given points of the cigarettes (4) carried by said seats (11) to form on each said cigarette (4) a number of rings (2) of ventilation holes (3) equal to said given number.

2. A unit as claimed in claim 1, wherein said diffracting optical element (49; 68) has a flat front surface (50; 69) crosswise to said focused beam (35; 36), and a given number of flat rear surfaces (51; 70); said rear surfaces (51; 70) being inclined at a given angle (A) in relation to said front surface (50; 69) to divide the focused beam (35; 36) into said given number of further focused beams (52; 71).

3. A unit as claimed in claim 2, wherein said given number is equal to two.

4. A unit as claimed in claim 3, wherein said focusing means (48; 67) comprises a focusing leans (48; 67) facing said front surface (50; 68) of the diffracting optical element (49; 68).

5. A unit as claimed in claim 1, wherein said conveying means (5) comprises a drum (6) for rotating said seats about said first axis (7) at a first angular speed; said reflecting element (16) being mounted for rotation about said first axis (7) at a second angular speed; the ratio of said first and second angular speeds being a direct function of the number of ventilation holes (3) to be formed in each said ring (2) on each cigarette (4).

6. A unit as claimed in claim 1, further comprising dividing means (34) for dividing said laser beam (13) into at least two sub-beams (35; 36); said movable reflecting and focusing assembly (14) comprising one said diffracting optical element (49; 68) for each sub-beam (35; 36).

7. A unit as claimed in claim 6, wherein said dividing means (34) comprises a semitransparent mirror (34).

* * * * *